US007987380B2

(12) United States Patent
Godzinski et al.

(10) Patent No.: US 7,987,380 B2
(45) Date of Patent: Jul. 26, 2011

(54) METHODS AND APPARATUS TO DETECT VOLTAGE CLASS OF A CIRCUIT (75) Inventors: Stephane Godzinski, Peynier (FR); Gaetan Bracmard, Saint Savournin (FR)

(73) Assignee: Atmel Rousset S.A.S. (FR)

( * ) Notice: Subject to any disclaimer, the term of this patent is extended or adjusted under 35 U.S.C. 154(b) by 1084 days.

(21) Appl. No.: 11/691,875

(22) Filed: Mar. 27, 2007

(65) Prior Publication Data

US 2008/0244279 A1  Oct. 2, 2008

(51) Int. Cl.
    G06F 1/26  (2006.01)
(52) U.S. Cl. .......................... 713/340; 713/310
(58) Field of Classification Search .................. 713/300, 713/310, 340
    See application file for complete search history.

(56) References Cited

U.S. PATENT DOCUMENTS

| | | | |
|---|---|---|---|
| 4,099,139 A * | 7/1978 | Oguri | 330/298 |
| 5,619,165 A | 4/1997 | Fournel et al. | |
| 5,729,720 A | 3/1998 | Kua et al. | |
| 5,901,303 A | 5/1999 | Chew | |
| 5,929,414 A | 7/1999 | Saitoh | |
| 6,122,750 A | 9/2000 | Hayasaka | |
| 6,164,129 A | 12/2000 | Shin et al. | |
| 6,343,364 B1 | 1/2002 | Leydier et al. | |
| 6,718,274 B2 | 4/2004 | Huang et al. | |
| 6,883,715 B1 | 4/2005 | Fruhauf et al. | |
| 6,910,638 B2 | 6/2005 | Fruhauf et al. | |
| 6,913,196 B2 | 7/2005 | Morrow et al. | |
| 7,091,878 B2 | 8/2006 | Holle et al. | |
| 7,454,633 B2 * | 11/2008 | Sung et al. | 713/300 |
| 2002/0158126 A1 * | 10/2002 | Omet | 235/451 |
| 2003/0120938 A1 | 6/2003 | Mullor | |
| 2003/0178974 A1 * | 9/2003 | Rozsypal | 323/224 |
| 2005/0045720 A1 | 3/2005 | Fruhauf | |
| 2005/0069138 A1 | 3/2005 | de Jong | |
| 2006/0000917 A1 | 1/2006 | Kim et al. | |
| 2006/0067392 A1 * | 3/2006 | Waschura | 375/224 |
| 2006/0186211 A1 | 8/2006 | Kim et al. | |
| 2006/0192681 A1 | 8/2006 | Haider et al. | |
| 2008/0195875 A1 * | 8/2008 | Hobson | 713/320 |

FOREIGN PATENT DOCUMENTS

| | | |
|---|---|---|
| EP | 1674966 | 6/2006 |
| WO | WO 99/01815 | 1/1999 |
| WO | WO 01/99046 A2 | 12/2001 |

OTHER PUBLICATIONS

International Search Report and Written Opinion for PCT Application No. PCT/US2008/57721, dated Mar. 20, 2008.

* cited by examiner

Primary Examiner — Thuan N Du
(74) Attorney, Agent, or Firm — Fish & Richardson P.C.

(57) ABSTRACT

A method including monitoring whether an externally originating signal reaches a predetermined threshold value in a host, producing an output value based on the monitoring, and identifying a power environment for the host based on the output value is described. Also described is a method for determining the power environment of a host. Systems and hosts for implementing the methods are also described.

11 Claims, 5 Drawing Sheets

METHODS AND APPARATUS TO DETECT VOLTAGE CLASS OF A CIRCUIT

TECHNICAL FIELD

This invention relates to power management of circuits.

BACKGROUND

Secure integrated circuit cards, commonly referred to as smart cards, are available in a variety of shapes and sizes. Smart cards can be used to store and share information. Smart cards can be small enough to fit into a user's pocket or into a variety of electronic devices. Smart cards can be used in various electronic devices, including phones and personal digital assistants. Smart cards can be used for a number of different applications, including electronic payment systems, and for storing personal information. For example, a smart card can be used to store user account information and be included in a set-top box to facilitate pay-per-view or video-on-demand features and assist in the decryption of encrypted digital video streams. The smart card may communicate with a video provider to accomplish these tasks. As another example, a smart card such as a Subscriber Identity Module (SIM) card can be used in a mobile phone to store a user's personal information, such as his or her phone book, device preferences, saved text or voice messages, service provider information, etc. Storage of such information in a SIM card can enable a user to change phones while retaining their individual information (i.e., on the SIM card).

Smart cards may be structured to be compliant to various standards. Examples of standards include the ISO 7816 standard, ETSI standard, and EMV standard. The smart cards may also communicate with external devices using a variety of communication interfaces, such as an ISO 7816 interface, a USB interface, a MMC interface, and/or a SWP interface.

Based on an given application, a smart card may be configured to operate in a particular voltage class. In current conventional applications, each class defines a different voltage level as follows: class A devices operate at a voltage level of 5 volts +/−10%, class B devices operate at a voltage level of 3 volts+/− 10%, and class C devices operate at a voltage level of 1.8 volts+/− 10%. Typically, a smart card is configured to operate in a singular desired voltage class.

SUMMARY

In one aspect, a method is described that includes monitoring whether an externally originating signal reaches a predetermined threshold value in a host, producing an output value based on the monitoring, and identifying a power environment for the host based on the output value. The method may include setting an initial value. The host may be a smart card. The power environment may be identified from a plurality of possible power environments. The externally originating signal may be a power signal. The output value may be a logical output.

In another aspect, a method for determining the power environment of a host is provided that includes monitoring whether an externally originating signal reaches a predetermined threshold value in a host, producing a first output value based on the monitoring, identifying a first power environment for the host if the first output value meets a first specified criteria, producing a second output value based on the monitoring if the first output value does not meet a first specified criteria, and identifying a power environment for the host if the second output value meets a second specified criteria.

The method may include producing a third output value based on the monitoring if the second output value does not meet a second specified criteria, and identifying a power environment for the host if the third output value meets a third specified criteria. The method may include restarting a sequence with producing a first output value if the third output value does not meet a third specified criteria. The method may include using additional output values and additional specified criteria to identify the power environment. The first specified criteria and the second specified criteria may be the same. The host may be a smart card. Each output value may be a logical output.

In another aspect, a system for determining the voltage class of an environment is described that includes a hardware circuit including a signal monitoring circuit, a status register, and programmable control logic, and a software sequence to program the hardware circuit. The system may include one or more control registers. The system may include a central processing unit (CPU) bus that is able to communicate with the one or more control registers and the status register. The software sequence may change the values stored in the control registers. The values stored in the control registers may be used in generating an output from the signal monitoring circuit.

The signal monitoring circuit may include an analog supply monitor. The signal monitoring circuit may include a plurality of predetermined, selectable signal (e.g., voltage) levels. The predetermined, selectable signal levels may include a first selectable voltage level between class A voltage and class B voltage, and a second selectable voltage level between class B voltage and class C voltage. The signal monitoring circuit may be used to monitor a power signal. The status register may be modified based on output generated by the signal monitoring circuit. An output may be generated based on the power supplied to the signal monitoring circuit. An output may be generated based on the voltage level supplied to the signal monitoring circuit.

In another aspect, a host is described that includes a hardware circuit including a signal monitoring circuit for monitoring an externally originating signal, a status register to store output generated from the hardware circuit, a software sequence to program the hardware circuit including programming for the signal monitoring circuit to generate an output and programmable control logic to identify a power environment based on the generated output, and a bus to interface with the status register and obtain the generated output. The host may be a smart card. The host may include one or more communication interfaces.

In another aspect, a method for determining the power environment of a host is described that includes means located within the host for monitoring an externally originating signal, means for producing an output value based on the monitoring, and means for identifying the power environment of the host based on the output. The method may include means for programming a software sequence used in monitoring the externally originating signal.

Automatic detection methods may provide various possible advantages. Different aspects and embodiments of the invention may include or provide none, one or more of the following advantages. Automatic detection techniques for smart cards to determine a current operation voltage range can be beneficial for many reasons, including the ability to use the same smart card in a number of devices. Automatic detection techniques may reduce manufacturing costs as the same smart card could be manufactured for a number of different applications. These techniques may also reduce user costs and time, as the same smart card could be transferred from one device to another as the user upgrades devices, or could be transferred from one device to another to transfer information, etc.

The details of one or more implementations of the invention are set forth in the accompanying drawings and the description below. Other features, objects, and advantages of the invention will be apparent from the description and drawings, and from the claims.

DETAILED DESCRIPTION

A smart card system is described that may use a combination of hardware and software to determine in which signal environment the smart card is powered. In one embodiment, the signal environment is a voltage class. In some implementations, the system can determine the signal environment by executing a software sequence to detect a voltage range of a supplied voltage. For example, the system may have the ability to determine that the supplied voltage is a class A voltage when the supplied voltage is greater than 4.0 V In another example, the system may determine that the supplied voltage is a class B voltage when the supplied voltage is greater than 2.4 V and not a class A voltage. In another example, the system may determine that the supplied voltage is a class C voltage when the supplied voltage is not a class A nor a class B voltage. Other configurations of signals and signal classes are possible.

Figure 1:
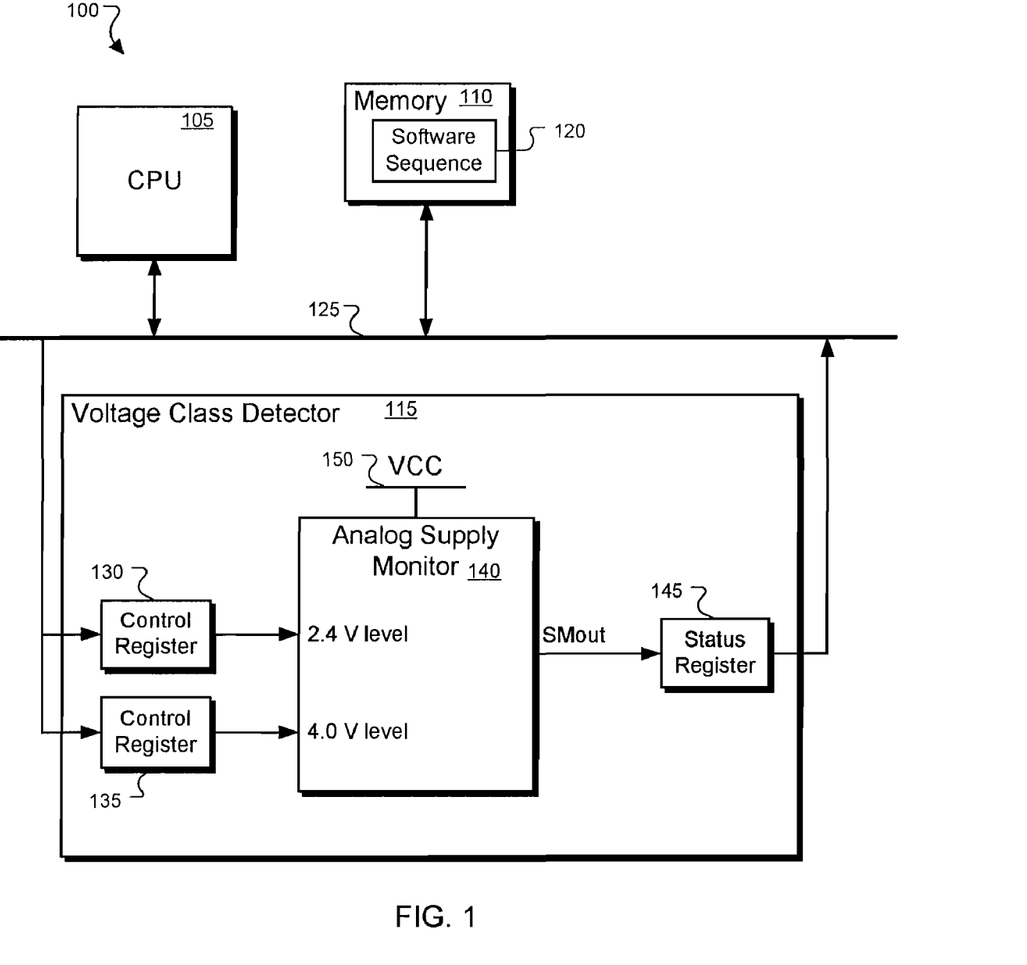
FIG. 1 is block diagram illustrating an example system for determining the signal environment (e.g., voltage class) of a supplied signal.

FIG. 1 is block diagram illustrating an example system for determining the signal environment (e.g., voltage class) for a device given a supplied signal. By way of example, reference will be made to a signal voltage, though other forms of signals (e.g., currents) are possible. Further, reference will be made to three classes of voltage signals at particular voltage levels, though other numbers of classes at other signal levels are possible. In one implementation, the system 100 is capable of determining the voltage class of a voltage signal (i.e., the input signal) supplied to the system 100. In one implementation, the system 100 includes a CPU 105, a memory 110, and a voltage class detector ("VCD") 115. In one implementation, the memory 110 includes a software sequence 120. By executing the software sequence 120, the CPU 105 can program the VCD 115 to determine the voltage class of the input signal (e.g., an input power signal). In one implementation, the system 100 may detect a voltage class of an input signal of a multiple voltage usage smart card (e.g., a smart card that can be used in different class devices or applications).

The CPU 105 can transmit data to and receive data from a CPU bus 125. For example, the CPU 105 can read data, including the software sequence 120, from the memory 110 via the CPU bus 125. In one implementation, the CPU 105 can obtain and execute software instructions from the memory 110. The software sequence 120 may be a sequence of the software instructions to be executed by the CPU 105. In one implementation, the software sequence 120 can instruct the CPU 105 to perform a variety of operations during execution, such as transmitting signals, receiving signals, performing arithmetic operations, branching to another sequence of software instructions, and/or performing other CPU operations.

In the example shown in FIG. 1, the CPU 105 can also transmit control signals to and receive output signals from the VCD 115 using the CPU bus 125. In one implementation, the CPU 105 can transmit one or more signals to the VCD 115 which in turn can generate an output based on the input signal. The CPU 105 can receive the generated output from the VCD 115. For example, the CPU 105 can transmit signals to the VCD 115 to determine whether the input signal is in voltage class A and receives an output signal from the VCD 115. If the output signal meets certain parameters, for example, then the CPU 105 may determine that the input signal is voltage class A. If the output signal does not meet certain parameters, for example, the CPU 105 may determine that the input signal is not voltage class A signal. Some examples of methods that may be used to determine a supplied signal environment (e.g., voltage class) are described below with reference to FIGS. 2-3.

The VCD 115 may include a number of subsystems and circuits. In one implementation, the VCD 115 may include one or more control registers 130, 135, an analog supply monitor 140, and a status register 145. The control registers 130, 135 may receive signals from the CPU 105 through the CPU bus 125. In various implementations, the control registers 130, 135 may include control logic to generate selection signals for transmission to the analog supply monitor 140 to allow selection of one of the voltage levels. In some implementations, the selection signals may be generated based on the signals received from the CPU 105.

The analog supply monitor 140 may include a plurality of predetermined selectable voltage monitoring levels. In one implementation, the analog supply monitor 140 may include two selectable voltage levels at 2.4 V and 4.0 V, respectively. In some implementations, the voltage monitoring levels may be set internally and defined by the outputs of the control registers 130, 135. For example, the analog supply monitor 140 may include control logic to select one of the predetermined voltage monitoring levels based on the selection signals received from the control registers 130, 135.

As discussed above, in various implementations the voltage monitoring level of the analog supply monitor 140 may be selected based on the inputs from the control registers 130, 135. In one implementation, the control registers 130, 135 may include selection logic, such as a multiplexer, to select one of the predetermined voltage monitoring levels based on the received signals from the CPU 105. In one implementation, the control register 130 can be configured such that a signal is generated to select a 2.4 V monitoring level. In one implementation, the control register 135 can be configured such that a signal is generated to select a 4.0 V monitoring level. In other implementations, other monitoring levels may be used.

The analog supply monitor 140 may be configured to receive an input signal 150 (e.g. a voltage) from an external environment. In one implementation, using the selected voltage monitoring level(s), the analog supply monitor 140 can determine the supplied voltage class of the external environment using the input signal 150. In one implementation, the analog supply monitor 140 may compare the input signal 150 and the selected voltage level. Based on the comparison result, the analog supply monitor 140 may, for example, set a value, retain a value, or clear a stored value in the status register 145.

In one example, the CPU 105 can execute the software sequence 120 to determine the voltage class of the input signal 150. In one implementation, the CPU 105 may execute the software sequence 120 to determine the voltage class when the system 100 is powered up or reset. In another implementation, the CPU 105 can execute the software sequence 120 when there is a change in the voltage levels of the input signal 150. For example, the system 100 may detect a change in a supplied voltage level of the input signal 150 and transmit an interrupt to the CPU 105. After receiving the interrupt, the CPU 105 may then execute the software sequence 120 to determine the supplied voltage class of the input signal 150. In another implementation, the CPU 105 may execute the software sequence 120 during a maintenance operation. For example, the CPU 105 may execute a maintenance operation, which includes determining the voltage class, periodically (e.g., every day, every hour, etc.) or non-periodically (e.g., execute when a user selects to execute the maintenance operation).

When the CPU 105 executes the software sequence 120, the CPU 105 may execute instructions to transmit the one or more selection signals to the control registers 130, 135 to initiate selection of one or more of the predetermined voltage levels. The analog supply monitor 140 may compare the selected voltage level and the input signal level. Based on the comparison result, the analog supply monitor 140 may set or clear one or more values stored in the status register 145. In one implementation, the analog supply monitor 140 may clear the status register 145 when the analog supply monitor 140 detects that the supplied voltage is higher than the selected voltage level. In one implementation, the analog supply monitor 140 may set the status register 145 when it detects that the supplied voltage is lower than the selected voltage level (i.e., when the supplied voltage is less than the selected voltage level).

The CPU 105 can access and read values stored in the status register 145 via the CPU bus 125. Based on the values (e.g., set or clear) in the status register 145 of the analog supply monitor 140, the CPU 105 may determine whether the voltage class of the input signal has been identified, and/or whether more operations are required to identify the voltage class of the input signal.

Figure 2:
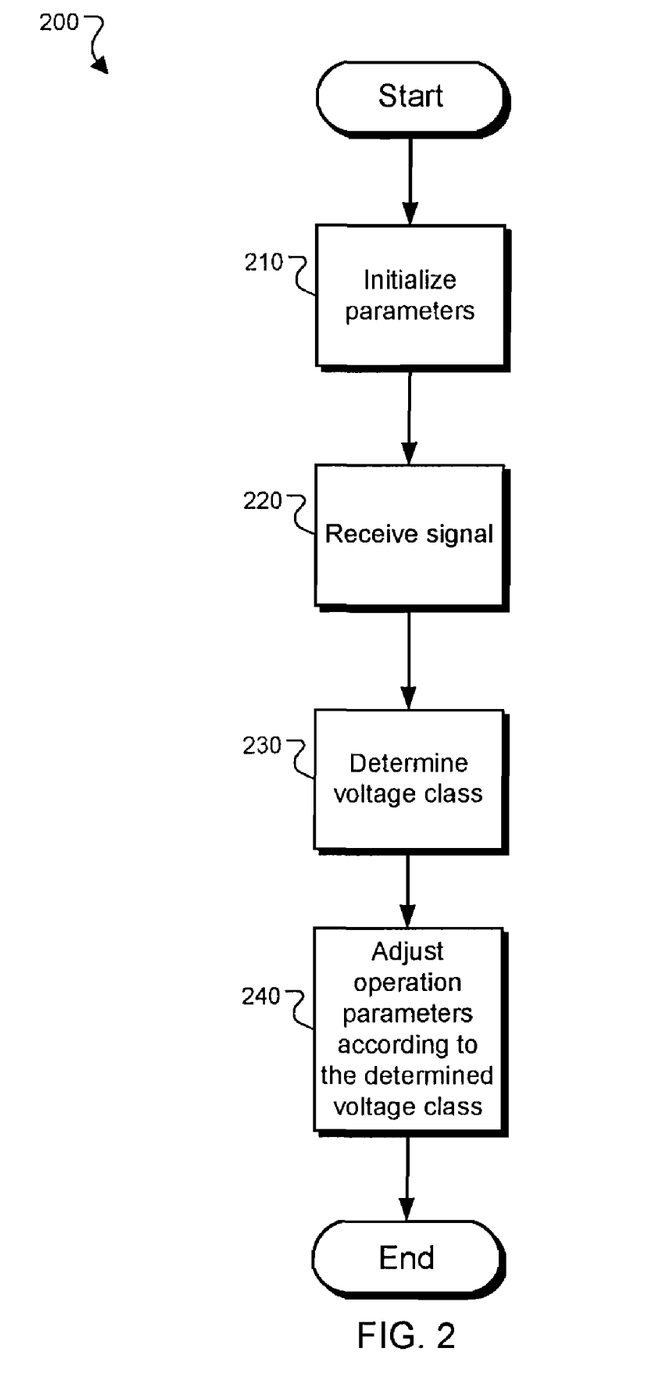
FIG. 2 is a flow diagram illustrating an example method for a smart card to identify and operate in multiple signal environments.

FIG. 2 is a flow diagram illustrating an example method 200 for a smart card to identify and operate in multiple signal environments.

Method 200 may be used by a smartcard to identify a voltage class and possibly adjust operating parameters based on the identified voltage class. In some implementations, the method 200 may be performed by a system including a processor. Examples of microprocessors that may be used include the microprocessor of a mobile device or the CPU of a video set-up box. An exemplary system 100 that may be used to identify a voltage class of an input signal is shown in FIG. 1.

The method 200 begins by initializing parameters 210. In one implementation, a processor (e.g., CPU 105) may initialize parameters, such as reset registers, input power sources, and other hardware, by executing a startup code (e.g., a bootloader code). For example, a system reset of the system 100 (FIG. 1) may trigger the CPU 105 to initialize parameters by executing the startup code stored in the memory 110.

After initialization, the system may receive an input signal 220 (e.g., a supplied voltage VCC). In one implementation, an analog monitor circuit 140 may receive an input signal 150 from an external environment. For example, the system 100 (FIG. 1) can receive the input signal 150 from an external source.

The voltage class 230 of the supplied signal may then be determined. In one implementation, a system 100 may determine whether the voltage class 230 of the supplied input signal 150 (e.g., voltage VCC) is a class A voltage, a class B voltage, or a class C voltage. For example, the CPU 105 (FIG. 1) may execute the software sequence 120 to determine the voltage class of the input signal. An example of method that may be used to determine the voltage class 230 is described below with reference to FIG. 3.

After the voltage class is determined, one or more actions may be initiated. In one implementation, operating parameters may be adjusted according to the determined voltage class 240.

Figure 3:
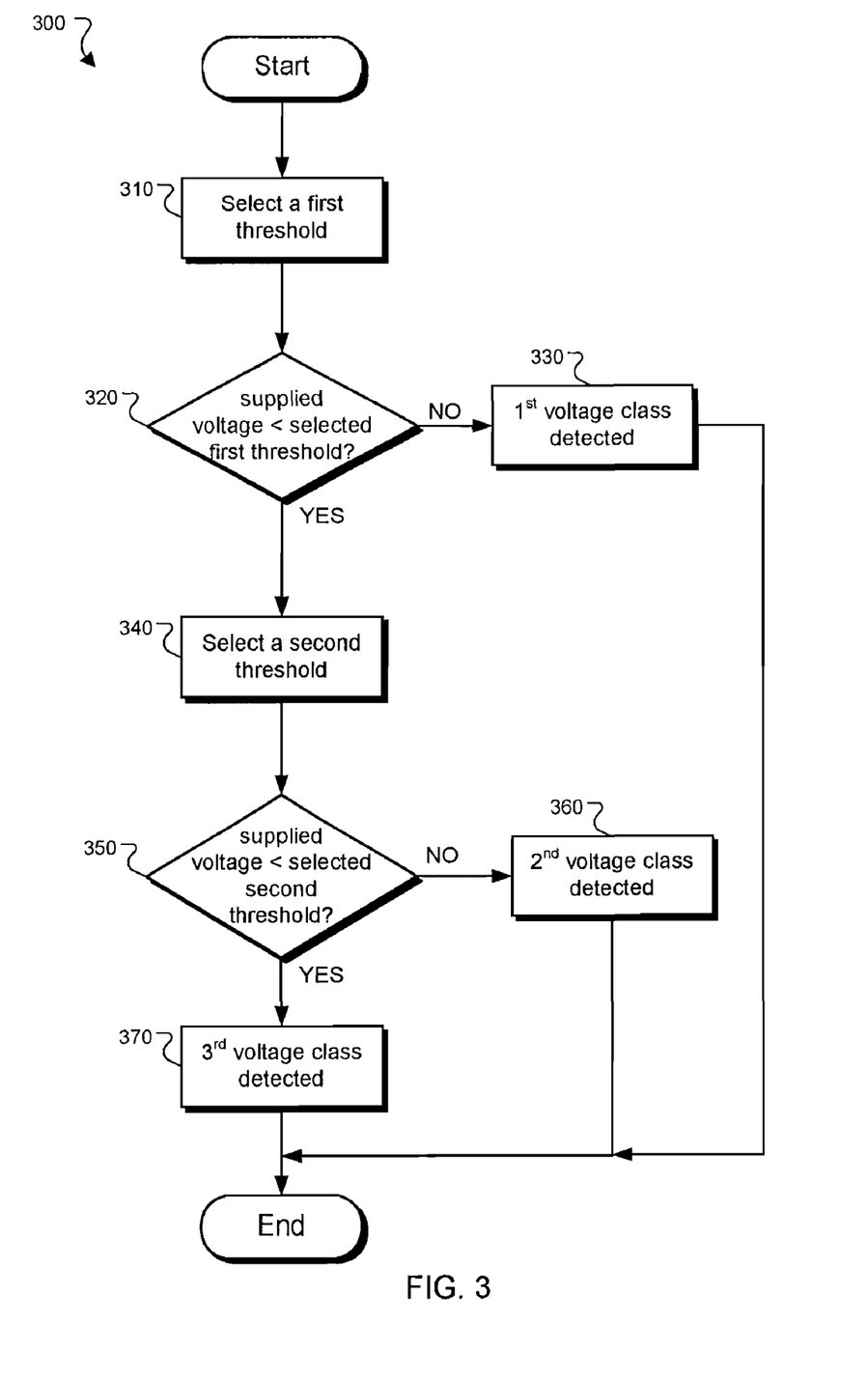
FIG. 3 is a flow diagram illustrating an example method to determine a signal class.

FIG. 3 is a flow diagram illustrating an example method 300 to determine a signal class of an input signal.

In some implementations, the method 300 may be performed by a system (e.g., system 100). The system may include a processor (e.g., CPU 105). For example, the method 300 may be performed by a system including a circuit (e.g., analog monitor circuit 140) and a processor to determine a voltage class of a signal as required in step 230 shown in FIG. 2. An exemplary system 100 that may be used to identify a voltage class is shown in FIG. 1.

In one implementation, the system receives a supplied input signal for which the voltage class is to be determined. The supplied input signal may be an input voltage signal to a circuit that is provided from an external source (e.g., a battery). The method 300 may be performed by the processor that is executing a software sequence (e.g., sequence 120). In one implementation, the software sequence may include instructions that, when executed, instruct the processor to transmit control signals to a detector (e.g., analog supply monitor 140) to determine a voltage class of the input signal.

The method 300 may begin by selecting a first threshold 310. In one implementation, the first threshold may be a voltage level. For example, the processor (e.g., CPU 105) can execute a software instruction to select a first threshold voltage level and transmit a control signal to a detector (e.g., voltage class detector 115) to set a detection level. In the exemplary system 100, the CPU 105 can transmit a control signal to the control registers 130, 135 to configure the control registers 130, 135 and select a 4.0 V monitoring level. For example, the control registers 130, 135 can transmit signals to the analog signal monitor 140 to disable the 2.4 V selectable voltage level and enable the 4.0 V selectable voltage level.

Next, a determination is made whether the level of the supplied signal (e.g., voltage level) reaches or exceeds the selected threshold 320. In one implementation, the detector (e.g., analog monitor circuit 140) may include a comparator to compare the selected threshold against the input signal.

In one embodiment, after the 4.0 V monitoring level is enabled, the analog supply monitor 140 may compare the input voltage VCC with the 4.0 V level. This operating condition is shown represented as operating state 410 in FIG. 4. The possible voltages of the supplied signal is shown in operating state 410 as either a shaded area (e.g., voltage less than 4.0V) or a clear area (e.g., voltage equal to or greater than 4.0V). In some implementations, the processor can read a status register (e.g., the status register 145) to determine whether the voltage level of the supplied signal has been identified. As an illustrative example, the detector may set or clear a value stored in the status register. In this implementation, the shaded area indicates voltages where the analog supply monitor 140 will set the status register 145 based on the comparison result, and the non-shaded area indicates voltages where the analog supply monitor 140 will clear the status register 145 based on the comparison result. In the depicted implementation, the CPU 105 may identify that the input voltage VCC is class A in the state 410 if the status register 145 is cleared. In contrast, if the status register 145 is set, the CPU 105 may identify that the input voltage VCC is not class A (e.g., class B or class C).

Referring to FIG. 3, if the determination in step 320 fails (e.g., it is determined that the supplied voltage exceeds the selected threshold), then a first voltage class is detected 330 and the method 300 ends. Else, additional processing steps may be executed.

If processing continues, a second threshold is selected 340. In one implementation, the second threshold may be less than the first threshold. In one implementation, the first threshold may be a voltage level. For example, the processor (e.g., CPU 105) can execute a software instruction to select a second threshold voltage level and transmit a control signal to a detector (e.g., voltage class detector 115) to set a detection level. In the exemplary system 100, the CPU 105 can transmit a control signal to the control registers 130, 135 to configure the control registers 130, 135 and select a 2.4 V monitoring level. For example, the control registers 130, 135 can transmit signals to the analog signal monitor 140 to disable the 4.0 V selectable voltage level and enable the 2.4 V selectable voltage level.

Next, a determination is made whether the level of the supplied signal (e.g., voltage level) reaches or exceeds the second selected threshold 350. In one implementation, the detector (e.g., analog monitor circuit 140) may include a second comparator to compare the selected threshold against the input signal.

In one embodiment, after the 2.4 V monitoring level is enabled, the analog supply monitor 140 may compare the input voltage VCC with the 2.4 V level. This operating condition is shown represented as operating state 440 in FIG. 4. The possible voltages of the supplied signal are shown in operating state 440 as either a shaded area (e.g., voltage less than 2.4V) or a clear area (e.g., voltage equal to or greater than 2.4V). In some implementations, the processor can read a status register (e.g., the status register 145) to determine whether the voltage level of the supplied signal has been identified. As an illustrative example, the detector may set or clear a value stored in the status register. In this implementation, the shaded area indicates voltages where the analog supply monitor 140 will set the status register 145 based on the comparison result, and the non-shaded area indicates voltages where the analog supply monitor 140 will clear the status register 145 based on the comparison result. In the depicted embodiment, the CPU 105 may identify that the input voltage VCC is either class A or class B in the state 440 if the status register 145 is cleared. In contrast, if the status register 145 is set, the CPU 105 may identify that the input voltage VCC is class C.

Referring to FIG. 3, if the determination in step 350 fails (e.g., it is determined that the supplied voltage exceeds the selected threshold), then a second voltage class is detected 360 and the method 300 ends. Else, a third voltage class is detected 370 and the method 300 ends.

In other implementations, the system can execute the process steps 310-370 using different threshold values. Although 4.0V and 2.4V exemplary threshold values have been used for clarity throughout the description, many other selectable voltage levels (e.g. 3.9V and 2.5V, 4.1V and 2.3V, etc), may also be used.

In some implementations, the system can execute process steps using different threshold values in different order to determine the voltage class of a system. For example, the detector can first select a second voltage threshold (e.g., the lower voltage threshold). Next, the detector can determine whether the supplied voltage is less than the second voltage threshold. If the determination passes (e.g., it is determined that the supplied voltage exceeds the selected threshold), then a third voltage class is detected. Else, the detector can select the first threshold. Using the first threshold, the detector can determine whether the level of the supplied signal (e.g., voltage level) is less than the selected threshold. If the determination fails (e.g., it is determined that the supplied voltage exceeds the selected threshold), then a second voltage class is detected and the method ends. Else, a first voltage class is detected and the method ends.

In various implementations, an additional confirmation test may be conducted. For example, the confirmation test can be implemented in the method after a third voltage class is detected. In one implementation, a third threshold, which may be lower than the second threshold may be used. In some implementations, additional thresholds may be selected to identify additional signal environments (e.g., additional voltage classes). In one implementation, the method 300 can be augmented by having additional thresholds to identify additional voltage classes. In another implementation, the system 100 may include additional control registers to select the additional thresholds to accommodate the extra comparisons.

Figure 4:
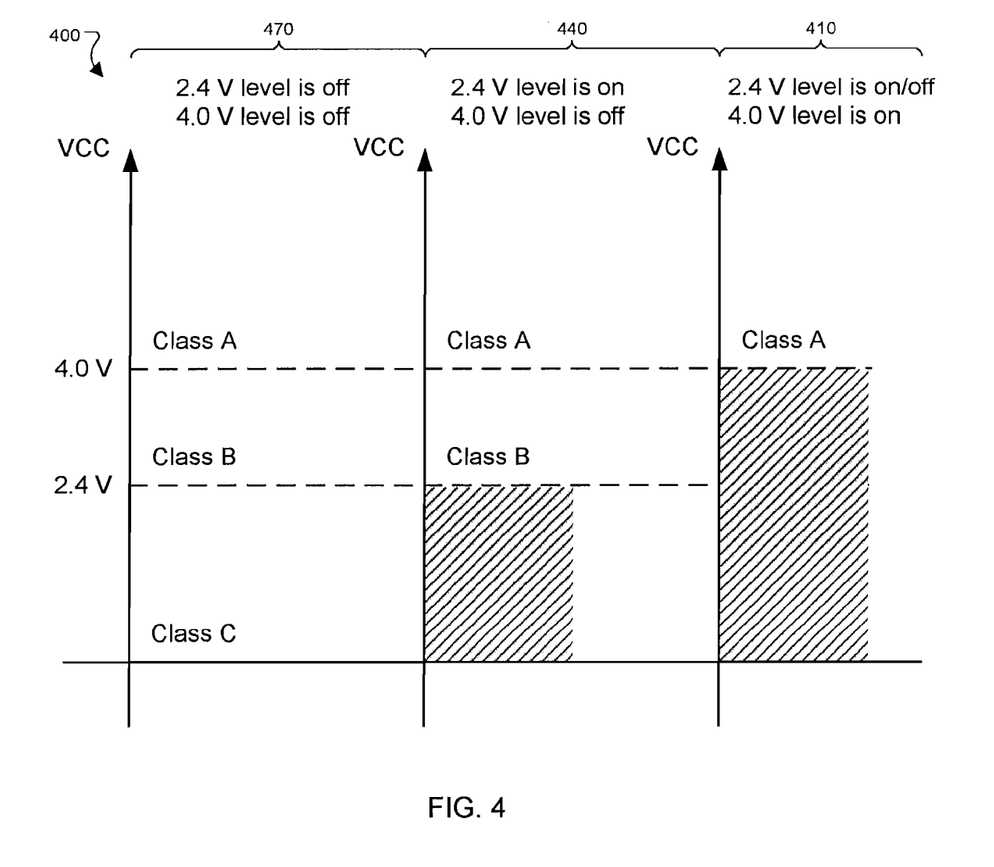
FIG. 4 is a graph showing example voltage ranges of multiple voltage classes.

FIG. 4 is a graph showing example voltage ranges in different operating states 410, 440, 470. The graph 400 illustrates examples of how the values stored in the status register 145 (FIG. 1) may be based on the settings of the control registers 130, 135 and an input signal 150. In the examples shown, the analog supply monitor 140 may set one or more values in the status register 145 based on the results from one or more of the three operating states 410, 440, 470. The value in the status register 145 may be set or cleared by determining whether the level of the input signal (e.g., voltage VCC) is higher or lower than a selected voltage level (e.g. 2.4 V and 4.0 V). In one implementation, the CPU 105 can use the control registers 130, 135 to control the operating states 410, 440, 470 of the analog supply monitor 140, and read the stored value in the status register 145 in order to determine the voltage class of the input voltage VCC.

As described in FIG. 3, in one specific implementation, a system receiving an input signal (e.g., an input voltage signal to smart card) above 4.0 V will be detected as a Class A system. FIG. 4 illustrates this as operating state 410. Similarly, a system operating and providing an input signal in the range of 2.4 V to 4.0 V will be detected as a Class B system. FIG. 4 illustrates this as operating state 440, which may follow operating state 410 in a testing sequence. In one embodiment, if the system is not a Class A system, then the detector can determine whether the system is a Class B system or a Class C system by operating in the state 440. Also, a system operating and providing an input signal below 2.4 V (such as at around 1.8 V) will be detected as a Class C system. In addition, an operating state can be used to confirm the presence of a signal. FIG. 4 illustrates this as operating state 470.

A CPU (e.g. the CPU 105 in FIG. 1) can control the detector to be operating in one of the operating states to determine a voltage class of a presently supplied signal. In one implementation, the software sequence 120 can include selecting an initial (e.g., voltage) monitoring level at the analog supply monitor 140. Based on the output of the analog supply monitor 140, the software sequence 120 can include logic (e.g., the logic implemented in the method 300 described with reference to FIG. 3) for determining the supplied signal class or alternating the operating states 410, 440, 470 of the analog supply monitor 140 to identify the input voltage VCC.

Figure 5:
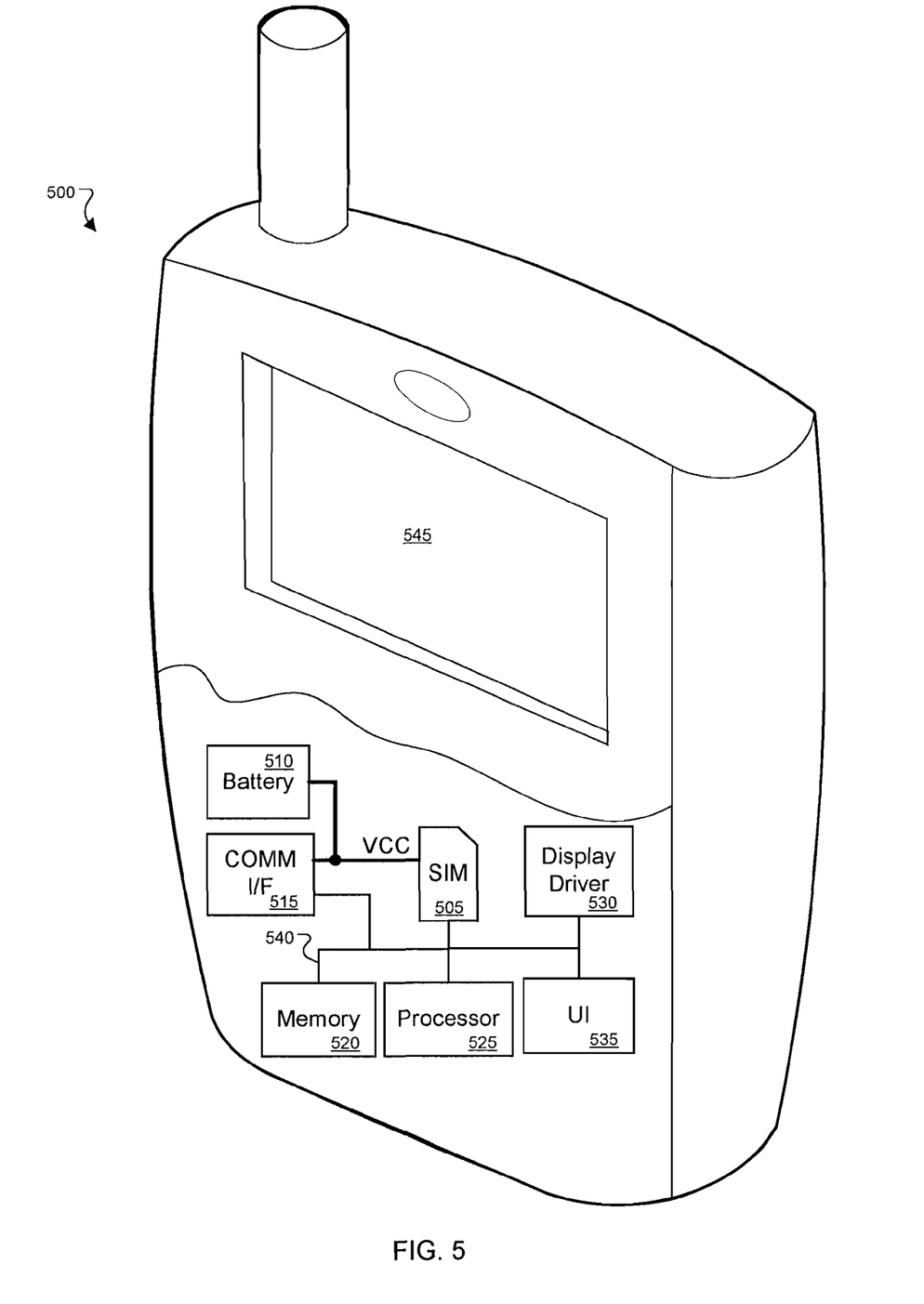
FIG. 5 is a block diagram illustrating a mobile phone that includes a smart card.

FIG. 5 is a block diagram illustrating a mobile phone that includes a smart card. An example of a smart phone 500 including a smart card 505 is shown. The phone 500 includes a Subscriber Identity Module (SIM) smart card 505, a battery 510, and a communication interface 515. In some examples, the battery 510 and/or the communication interface 515 may provide operating power to the smart phone 500, including the SIM 505. In this example, the SIM 505 is used in a mobile phone application. In some implementations, the SIM 505 may also be used in multiple models of the phone 500. However, the battery 510 and the communication interface 515 in different smart phones 500 may supply power at different voltage ranges. According to the supplied voltage ranges, some operating parameters of the SIM 505 may require adjustment. By executing a software sequence (e.g., the software sequence 120 in FIG. 1), the SIM 505 can identify a supplied voltage range provided by the battery 510 and/or the communication interface 515. In some examples, the SIM 505 may adjust operating parameters based on the identified voltage class using, for example, the method 300. Consequently, the detection of a voltage class level can lead to the subsequent setting of internal parameters in the device (e.g., the smart card can adjust an output of an internal voltage regulator to allow for proper operation of the device given the input power provided).

As shown in the example of FIG. 5, the SIM 505 is connected to a memory 520, a processor 525, a display driver 530, and a user interface (UI) 535 using a data bus 540. Data may be transmitted through the data bus. For example, the processor 525 may process data received from the communication interface 515. The processor 525 may also store the resulting data in the memory 520 using the data bus 540. In another example, a user may use the UI 535 to input a phone number to be displayed on a display 545 using the display driver 530. In some implementations, the SIM 505, the memory 520, the processor 525, the display driver 530, the UI 535, and the display 545 may be powered by the battery 5 10 and/or the communication interface 515.

In some examples, the communication interface 515 may be compliant to one or more industry standards, such as European Telecommunications Standards Institute (ETSI), ISO 7816, or EMV Some of these industry standards may require the communication interface to supply power in different voltage ranges (e.g., class A, class B, or Class C). In some implementations, the phone 500 may include more than one communication interface. For example, the phone 500 ma include an ISO 7816 interface, an USB interface, a MMC interface, and a SWP interface. To feature these interfaces and to be compatible with different industry standards, the SIM 505 may include the system 100 to detect the supplied voltage range. In some implementations, an operating system embedded in the phone 500 can control the SIM to execute the software sequence to determine a voltage class and adjust operation parameters. For example, the SIM 505 may use the method 300 to determine the supplied voltage class.

After the voltage class detection has been completed, the CPU may send additional instructions, or may provide control or input to other processes or components.

In one approach, the system may include a regulator, and the programming of the regulator may be guided by instructions from the CPU. The instructions may be based on the results obtained from a supply monitor. The instructions may be based on the determined voltage class. The regulator may regulate the incoming supplied power, enabling a smart card to operate in the identified power environment. The CPU may send a control signal, enabling the regulator to establish and maintain a desired voltage level output.

In another approach the CPU may be used by the Operating System to send instructions to parametrize oscillators and clock dividers in order to fit the power consumption restrictions specified for the detected voltage class. This approach may be used with a SIM card application, or in other applications.

In another approach, multiple application programs could be present in the memory. For example, there could be different application programs for voltage class A, voltage class B, and voltage class C. After having detected the voltage class, the operating system could be instructed to jump to the dedicated application.

In another implementation, the voltage class detection could be used to confirm that the integrated circuit ("chip") is operating in the proper environment. In one embodiment, a chip could feature multiple interfaces. For example, a chip may work with the new high speed communication interface standard, USB-IC (Inter-Chip). The protocol is close to USB 2.0, with the major differences from USB 2.0 being electrical points (e.g., power ranges and driver characteristics). For instance, in USB 2.0 the power range is 5V and the data signaling level is 3.3V. In USB-IC, the power range can be 3V or 1.8V and the data signaling level is the same level as the VCC.

In one implementation, a chip may feature multiple interfaces multiplexed on the same pads, enabling the chip and circuit to target multiple applications. For example, in one implementation, the circuit may be used to target mobile applications that require USB-IC and IT applications that require USB 2.0. The interface selection between IC and 2.0 may be done, for example, in software (such as programming a control register) following determination of the power environment.

In one implementation, the operating system may know that the chip is in a mobile environment by the detection of any activity on the standard communication ISO 7816 interface, and can program the USB interface in USB-IC mode. If no activity on that interface is detected, the chip may determine that the chip is in an IT world and the OS can program the USB interface in USB 2.0 mode. The voltage class detector can be used to confirm the chip is programmed for the right environment.

In another implementation, a chip may not include a low speed ISO 7816 interface. The voltage class detector may be used by the OS to know in which application the chip is used.

EXAMPLES

A smart card may be used to power a flash memory chip. Depending on the determined voltage class, the smartcard may enable or disable an on-chip voltage regulator that regulates voltage supplied to the flash memory chip. For example, the flash memory chip may be designed to operate at 1.8 V.

If the determined voltage class of the external environment is class B voltage (3 V), then the smartcard may enable the voltage regulator to regulate a 3 V supply VCC to 1.8 V for the flash memory chip.

If, however, the determined voltage class of the external environment is class C voltage, the smartcard may disable the voltage regulator because the supplied voltage is 1.8 V.

If, in another example, the voltage class of an external environment is class A (5 V), then the smartcard may enable the voltage regulator to regulate a 5 V supply VCC to 1.8 V In some cases, two sets of operating parameters may be used for regulating a 5 V input voltage and a 3 V input voltage. Based on the identified voltage class, the smart card can control the parameters to maintain the 1.8 V level for the flash memory chip.

A number of implementations of the invention have been described. Nevertheless, it will be understood that various modifications may be made without departing from the spirit and scope of the invention. For example, a voltage class detector may include other hardware, such as additional registers, multiplexers, and/or voltage sensors, to enhance performance of the voltage class detector. Accordingly, other implementations are within the scope of the following claims.

What is claimed is:

1. A system for detecting a voltage class of a circuit, the system comprising:
    a processor configured for:
        selecting a threshold voltage level corresponding to one of three or more voltage classes each having a respective class threshold voltage, and
        transmitting a control signal indicative of the threshold voltage level;
    a voltage class detector coupled to the processor and configured for:
        receiving the control signal;
        setting a detection voltage level based on the control signal;
        comparing a voltage of the circuit with the detection voltage level and determining that the voltage of the circuit reaches the detection voltage level; and
        in response to determining that the voltage of the circuit reaches the detection voltage level, determining that the voltage class of the circuit is the voltage class corresponding to the selected threshold voltage level.

2. The system of claim 1, further comprising one or more control registers for receiving the control signal and setting the detection voltage level based on the control signal.

3. The system of claim 2, wherein a software sequence executed by the processor changes values stored in the control registers using the control signal.

4. The system of claim 3, wherein the values stored in the control registers are used in generating an output from the voltage class detector.

5. The system of claim 1, wherein the voltage class detector comprises an analog supply monitor.

6. The system of claim 1, wherein the voltage classes are predetermined, selectable voltage classes in accordance with a standard.

7. The system of claim 1, wherein the detection voltage level comprises one of:
    a first selectable voltage level between class A voltage and class B voltage; and
    a second selectable voltage level between class B voltage and class C voltage.

8. The system of claim 1, further comprising:
    a status register coupled to the voltage class detector and configured to receive a signal from the voltage class detector indicating a voltage class of the circuit.

9. A method for determining a voltage class for a host device, comprising:
    selecting a first threshold voltage;
    monitoring whether a supply voltage of the circuit reaches the first threshold voltage;
    identifying a first voltage class for the host if the supply voltage does not reach the first threshold voltage;
    if the supply voltage reaches the first threshold voltage, selecting a second threshold voltage;
    monitoring whether the supply voltage reaches the second threshold voltage;
    identifying a second voltage class for the host if the supply voltage does not reach the second threshold voltage
    if the supply voltage reaches the second threshold voltage, selecting a third threshold Voltage;
    monitoring whether the supply voltage reaches the third threshold voltage; and
    identifying a third voltage class for the host if the supply voltage does not reach the third threshold voltage.

10. The method of claim 9, wherein the host is a smart card.

11. A system for determining a voltage class of a circuit, the system comprising:
    means for selecting a threshold voltage level corresponding to one of three or more voltage classes each having a respective class threshold voltage, and
    means for transmitting a control signal indicative of the threshold voltage level;
    means for receiving the control signal;
    means for setting a detection voltage level based on the control signal;
    means for comparing a supply voltage of the circuit with the detection voltage level and determining that the voltage of the circuit reaches the detection voltage level; and
    means for determining that the voltage class of the circuit is the voltage class corresponding to the selected threshold voltage level.

* * * * *

UNITED STATES PATENT AND TRADEMARK OFFICE
CERTIFICATE OF CORRECTION

| | | |
|---|---|---|
| PATENT NO. | : 7,987,380 B2 | Page 1 of 1 |
| APPLICATION NO. | : 11/691875 | |
| DATED | : July 26, 2011 | |
| INVENTOR(S) | : Stephane Godzinski and Gaetan Bracmard | |

It is certified that error appears in the above-identified patent and that said Letters Patent is hereby corrected as shown below:

Column 3, line 35, delete "4.0 V" and insert -- 4.0 V. --

Column 9, line 41, delete "5 10" and insert -- 510 --

Column 9, line 46, delete "EMV" and insert -- EMV. --

Column 10, line 67, delete "1.8 V" and insert -- 1.8 V. --

Column 12, line 23, after "voltage" and insert -- ; --

Column 12, line 25, delete "Voltage;" and insert -- voltage; --

Signed and Sealed this

Thirteenth Day of September, 2011

David J. Kappos
*Director of the United States Patent and Trademark Office*